US012631894B2

(12) United States Patent  (10) Patent No.:   US 12,631,894 B2
Muto et al.                                      (45) Date of Patent:        May 19, 2026

(54) LENS BARREL AND IMAGING APPARATUS

(71) Applicant: NIKON CORPORATION, Tokyo (JP)

(72) Inventors: Azusa Muto, Kawasaki (JP); Takatoshi Ashizawa, Yokohama (JP)

(73) Assignee: NIKON CORPORATION, Tokyo (JP)

( * ) Notice:  Subject to any disclaimer, the term of this patent is extended or adjusted under 35 U.S.C. 154(b) by 295 days.

(21) Appl. No.: 18/683,308

(22) PCT Filed:  Sep. 12, 2022

(86) PCT No.:   PCT/JP2022/034030
§ 371 (c)(1),
(2) Date:    Feb. 13, 2024

(87) PCT Pub. No.: WO2023/048001
PCT Pub. Date: Mar. 30, 2023

(65)         Prior Publication Data
US 2025/0138332 A1     May 1, 2025

(30)      Foreign Application Priority Data

Sep. 27, 2021     (JP) ................................. 2021-156270

(51) Int. Cl.
*G02B 27/64*         (2006.01)
*G02B 7/04*          (2021.01)
         (Continued)

(52) U.S. Cl.
CPC ............. *G02B 27/646* (2013.01); *G02B 7/04*
(2013.01); *G03B 13/34* (2013.01); *G03B 17/12* (2013.01);
         (Continued)

(58) Field of Classification Search
None
See application file for complete search history.

(56)          References Cited

U.S. PATENT DOCUMENTS

2007/0188048 A1    8/2007  Nagahama et al.
2009/0128931 A1*   5/2009  Matsumoto ............ G02B 7/102
                                                    359/823
          (Continued)

FOREIGN PATENT DOCUMENTS

JP         2012-124994 A     6/2012
JP         2016-033569 A     3/2016
          (Continued)

OTHER PUBLICATIONS

Nov. 22, 2022 Search Report issued in International Patent Application No. PCT/JP2022/034030.

(Continued)

*Primary Examiner* — Derek S. Chapel
(74) *Attorney, Agent, or Firm* — Oliff PLC

(57)          ABSTRACT

A lens barrel includes an outer barrel disposed further outward than a lens holding frame holding a lens, a guide portion guiding the lens holding frame in an optical axis direction, an actuator moving the lens holding frame in the optical axis direction, a detector that includes a scale portion arranged along the optical axis direction and a sensor portion opposed to the scale portion, and detects a position of the lens holding frame in the optical axis direction, and a controller controlling the actuator based on position information detected by the detector, wherein the lens holding frame holds one of the scale and sensor portions, the outer barrel holds the other, and the one is disposed at a position corresponding to a node of a vibration mode having a lowest natural frequency among vibration modes generated in the lens and the lens holding frame.

9 Claims, 8 Drawing Sheets

(51) Int. Cl.

| | | |
|---|---|---|
| *G03B 13/34* | (2021.01) | |
| *G03B 17/12* | (2021.01) | |
| *H04N 23/54* | (2023.01) | |
| *H04N 23/55* | (2023.01) | |
| *H04N 23/68* | (2023.01) | |

(52) U.S. Cl.
CPC ............. *H04N 23/54* (2023.01); *H04N 23/55* (2023.01); *H04N 23/687* (2023.01)

(56) References Cited

U.S. PATENT DOCUMENTS

| | | |
|---|---|---|
| 2012/0140115 A1 | 6/2012 | Kudo |
| 2019/0293902 A1* | 9/2019 | Kinouchi ............... G02B 7/102 |
| 2021/0088748 A1* | 3/2021 | Otsuka ................. G02B 15/145 |

FOREIGN PATENT DOCUMENTS

| | | |
|---|---|---|
| JP | 2019-191233 A | 10/2019 |
| JP | 2021-092645 A | 6/2021 |
| WO | 2006/004108 A1 | 1/2006 |

OTHER PUBLICATIONS

Apr. 2, 2024 International Preliminary Report on Patentability issued in International Patent Application No. PCT/JP2022/034030.

* cited by examiner

LENS BARREL AND IMAGING APPARATUS

TECHNICAL FIELD

The present disclosure relates to a lens barrel and an imaging apparatus.

BACKGROUND ART

In the lens barrel, focusing accuracy is required (for example, Patent Document 1).

PRIOR ART DOCUMENT

Patent Document

Patent Document 1: Japanese Patent Application Laid-Open No. 2021-92645

SUMMARY OF THE INVENTION

According to a first aspect, there is provided a lens barrel including: a lens holding frame that holds a lens; an outer barrel that is disposed further outward than the lens holding frame; a guide portion that guides the lens holding frame in an optical axis direction; a drive unit that moves the lens holding frame in the optical axis direction;

a detection unit that includes a scale portion arranged along the optical axis direction and a sensor portion arranged so as to face the scale portion, and detects a position of the lens holding frame in the optical axis direction; and a control unit that controls the drive unit based on information about a position detected by the detection unit, wherein the lens holding frame holds one of the scale portion and the sensor portion, the outer barrel holds another one of the scale portion and the sensor portion, and, in the lens holding frame, the one of the scale portion and the sensor portion is disposed at a position corresponding to a node of a vibration mode having a lowest natural frequency among a plurality of vibration modes generated in the lens and the lens holding frame.

According to a second aspect, there is provided an imaging apparatus including the above lens barrel and an image sensor.

The configuration of the embodiments described later may be appropriately improved, and at least some of the components may be replaced with other components. Further, the constituent elements whose arrangement is not particularly limited are not limited to the arrangement disclosed in the embodiment, and can be arranged at positions where the functions can be achieved.

MODES FOR CARRYING OUT THE INVENTION

Hereinafter, a lens barrel 100 in accordance with an embodiment will be described in detail with reference to the drawings. In each drawing, some elements may be omitted for ease of understanding.

Figure 1:
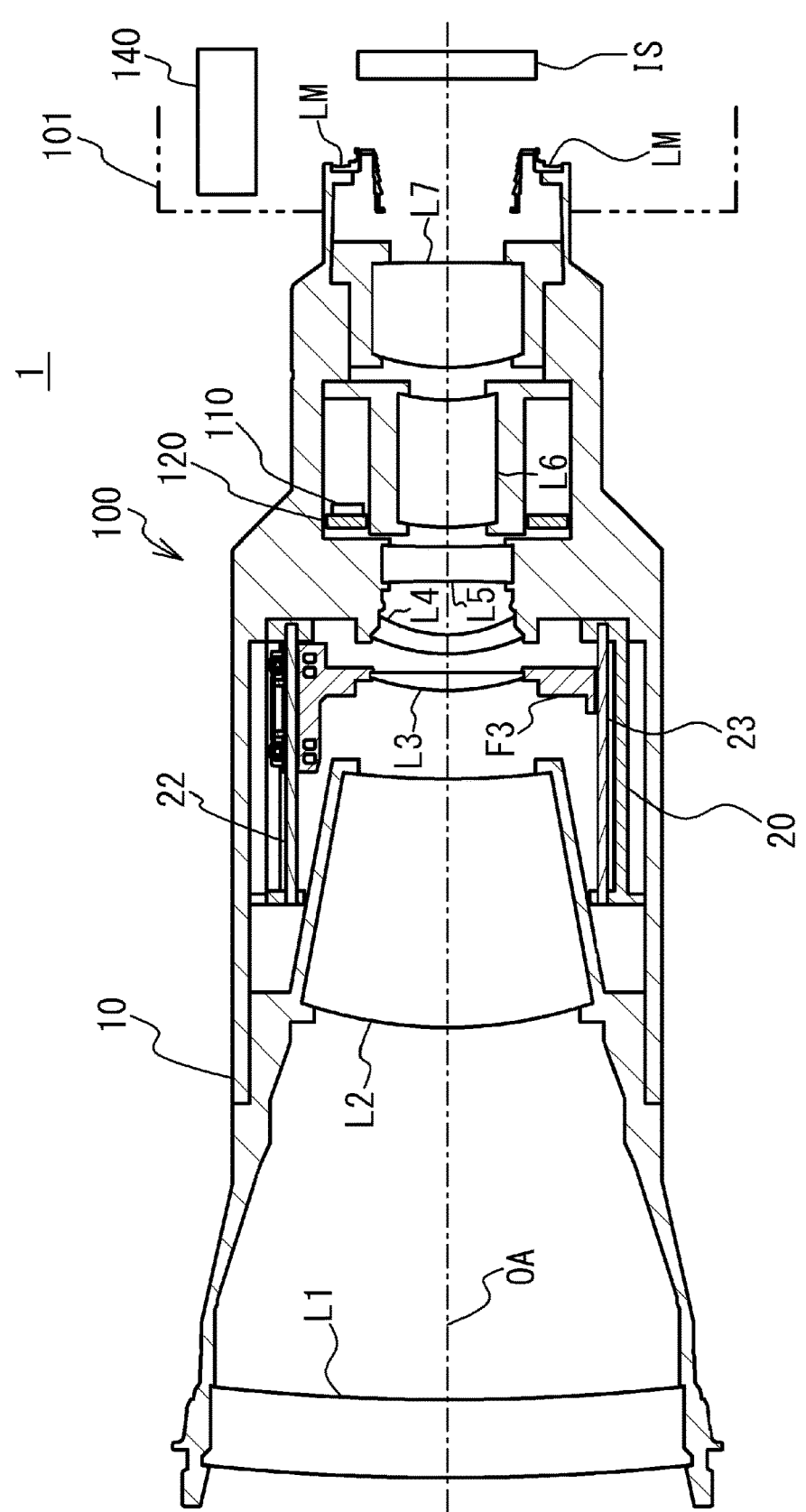
FIG. 1 illustrates a camera including a lens barrel and a camera body in accordance with an embodiment.

FIG. 1 illustrates a camera 1 including the lens barrel 100 and a camera body 101 in accordance with the embodiment. In the present embodiment, the lens barrel 100 is detachable from the camera body 101, but this does not intend to suggest any limitation, and the lens barrel 100 and the camera body 101 may be integrated.

The camera body 101 includes an image sensor IS, a control unit 140, and the like therein. The image sensor IS includes a photoelectric conversion element such as a CCD (Charge Coupled Device), for example, and converts a subject image formed by the imaging optical system (the lens barrel 100 attached to the camera body 101) into an electrical signal.

The control unit 140 includes a CPU (Central Processing Unit) and the like, and integrally controls the operation of the camera 1 as a whole, related to photographing including focus-driving in the camera body 101 and the lens barrel 100 attached to the camera body 101.

As illustrated in FIG. 1, the lens barrel 100 includes a first fixed barrel 10 and a second fixed barrel 20. In the present embodiment, the first fixed barrel 10 is composed of a plurality of components, but may be composed of one component. As illustrated in FIG. 1, a lens mount LM that enables the lens barrel 100 to be attached to and detached from the camera body 101 is fixed to the first fixed barrel 10.

The lens barrel 100 includes lens groups L1 to L7 sequentially arranged along a common optical axis OA. The lens group L3 is held by a lens holding frame F3, and the other lens groups are held by the first fixed barrel 10. Each of the lens groups L1 to L7 may include one lens or a plurality of lenses. The lens groups L1, L2, and L4 to L7 may be held by a lens holding frame that is movable in the optical axis OA direction, instead of the first fixed barrel 10.

Figure 2A:
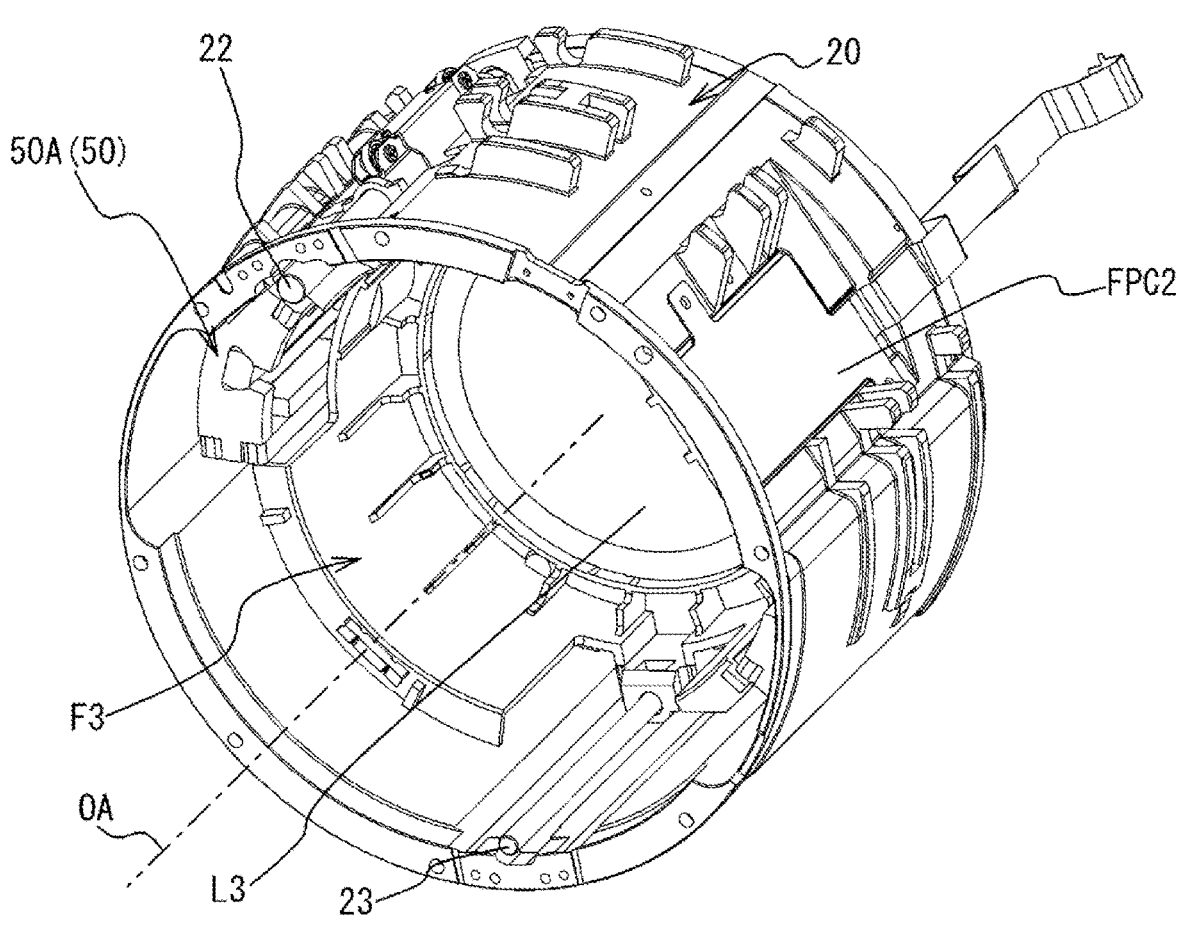
FIG. 2A is a perspective view of a second fixed barrel and a lens holding frame.
Figure 2B:
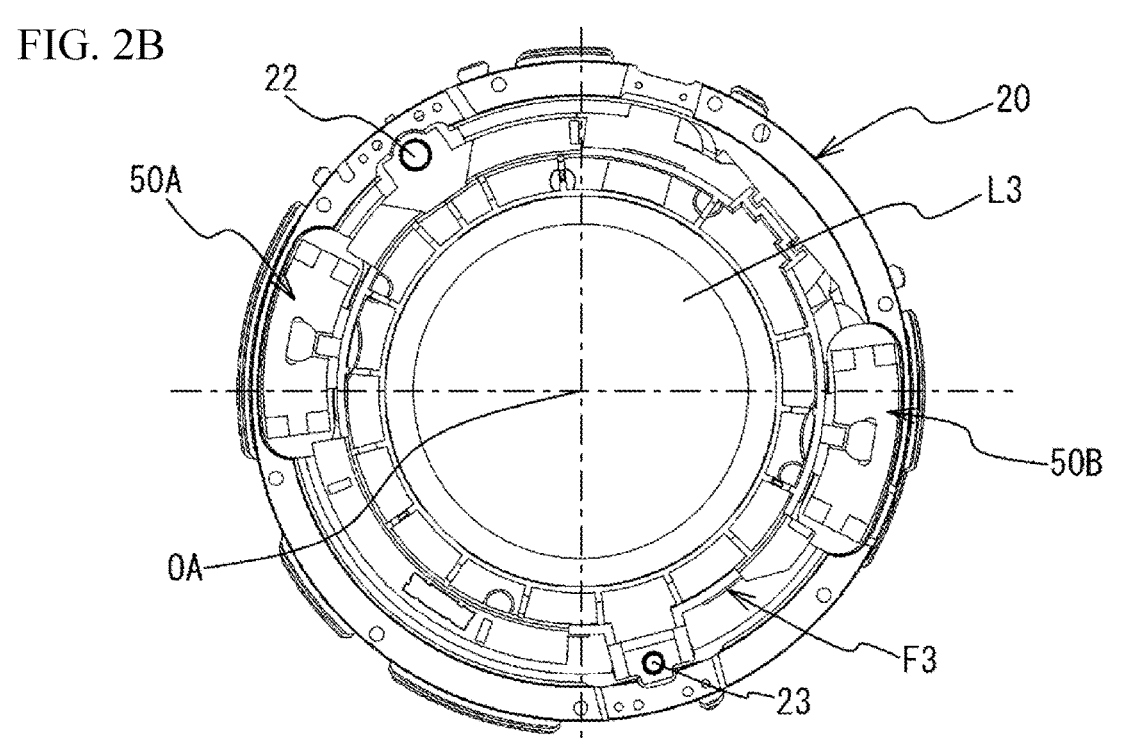
FIG. 2B is a plan view of the second fixed barrel and the lens holding frame as viewed from the subject side.

FIG. 2A is a perspective view of the second fixed barrel 20 and the lens holding frame F3, and FIG. 2B is a plan view of the second fixed barrel 20 and the lens holding frame F3 as viewed from the subject side. The second fixed barrel 20 is disposed further outward than the lens holding frame F3, and a guide bar 22 and a rotation restriction bar 23 are fixed to the second fixed barrel 20. The guide bar 22 guides the lens holding frame F3 in the optical axis OA direction. The rotation restriction bar 23 restricts the rotation of the lens holding frame F3 around the guide bar 22.

In addition, a first VCM (Voice Coil Motor) 50A and a second VCM 50B for moving the lens holding frame F3 in the optical axis OA direction are provided in the second fixed barrel 20. As illustrated in FIG. 2B, the first VCM 50A and the second VCM 50B are opposed to each other across the optical axis OA in a plane orthogonal to the optical axis OA. The number of VCMs is not limited to that of the present embodiment, and may be one, or three or more. In the following description, the first VCM 50A and the second VCM 50B are referred to as VCMs 50 unless otherwise specified.

The VCM 50 is driven by a drive device 110 (see FIG. 1) provided in the lens barrel 100. The drive device 110 controls focus-driving of the lens group L3 under the control of the control unit 140 of the camera body 101. Specifically, the drive device 110 generates a driving signal for the VCM 50 based on position information of the lens group L3 input from a position detector 60 described later and information about the target position of the lens group F3 input from the control unit 140 of the camera body 101, and outputs the generated driving signal to the VCM 50. The drive device 110 is provided on a main substrate 120.

Figure 3:
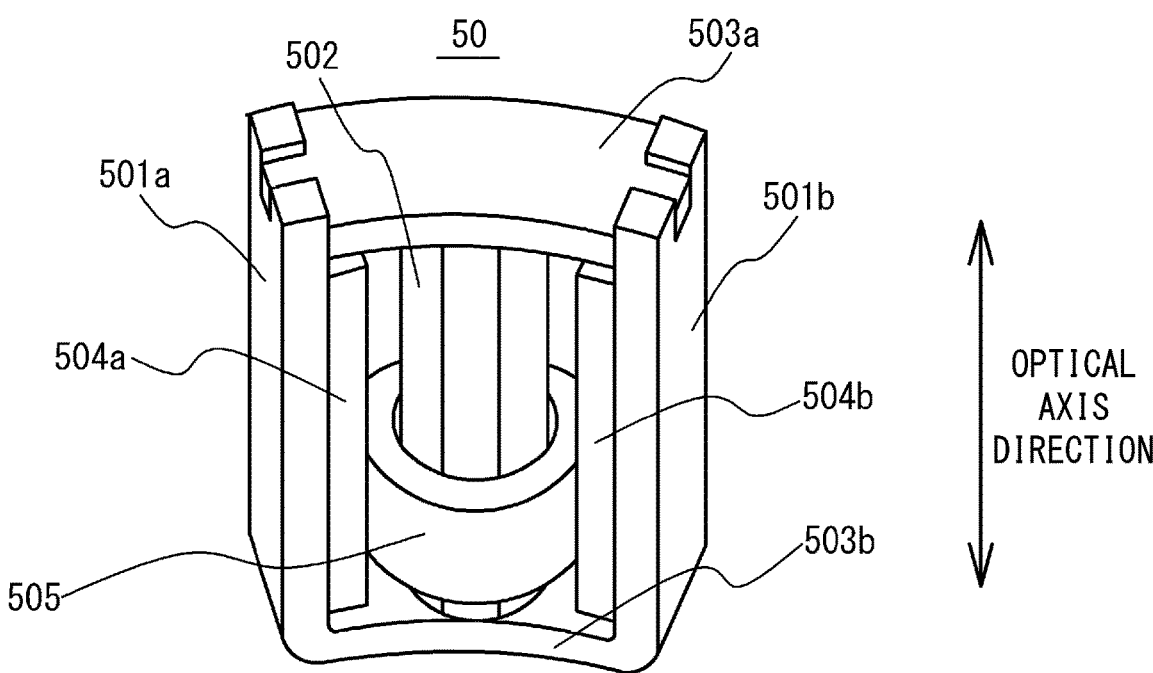
FIG. 3 illustrates a schematic configuration of a VCM.

FIG. 3 illustrates a schematic configuration of the VCM 50. The VCM 50 includes a first side yoke 501*a* and a second side yoke 501*b* that have a length in the optical axis OA direction, and a center yoke 502 that has a length in the optical axis OA direction and is disposed between the first side yoke 501*a* and the second side yoke 501*b*.

The VCM 50 includes an upper yoke 503*a* that connects first ends of the first side yoke 501*a*, the second side yoke 501*b*, and the center yoke 502 in the optical axis OA direction, and a lower yoke 503*b* that connects second ends of the first side yoke 501*a*, the second side yoke 501*b*, and the center yoke 502 in the optical axis OA direction. This forms a closed magnetic path.

A first magnet 504*a* is disposed on the side surface closer to the center yoke 502 of the first side yoke 501*a*, and a second magnet 504*b* is disposed on the side surface closer to the center yoke 502 of the second side yoke 501*b*. The first magnet 504*a* is arranged so that the side closer to the center yoke 502 is the north pole, and the second magnet 504*b* is also arranged so that the side closer to the center yoke 502 is the north pole. Thus, magnetic paths are formed in which magnetic fluxes enter the center yoke 502 from the north poles of the first and second magnets 504*a* and 504*b*, pass through the upper and lower yokes 503*a* and 503*b* and the first and second side yokes 501*a* and 501*b*, and return to the south poles of the first and second magnets 504*a* and 504*b*, respectively.

The VCM 50 includes a coil 505 through which the center yoke 502 penetrates. There is a slight clearance between the inner periphery of the coil 505 and the center yoke 502, and the coil 505 is movable in the optical axis OA direction. The coil 505 is configured so that the directions of the magnetic fluxes gathering from the first side yoke 501*a* and the second side yoke 501*b* to the center yoke 502 is perpendicular to the winding direction of the coil 505.

A drive signal (current) is input to the coil 505 from the drive device 110. When a current flows through the coil 505, the coil 505 moves in the optical axis OA direction by the magnetic force of the first magnet 504*a* and the second magnet 504*b*. More specifically, the coil 505 moves in the optical axis OA direction due to electromagnetic interactions between the coil 505 through which a current flows and the first magnet 504*a* and the second magnet 504*b*. By changing the direction of the current flowing through the coil 505, the moving direction of the coil 505 can be switched between the subject side and the camera body 101 side (image plane side). Further, by changing the current value of the current flowing through the coil 505, the driving force and the moving speed of the coil 505 can be changed.

In the present embodiment, the lens group L3 is a focus lens group, and is moved in the optical axis OA direction by the VCM 50 to adjust the focus. More specifically, since the yokes and the magnets are installed in the second fixed barrel 20, and the lens holding frame F3 that holds the lens group F3 is connected to the coil 505 of the VCM 50, when the coil 505 moves in the optical axis OA direction, the lens group L3 is moved in the optical axis OA direction. The lens group L3 may be moved using a stepping motor or an ultrasonic motor instead of the VCM 50.

Figure 4A:
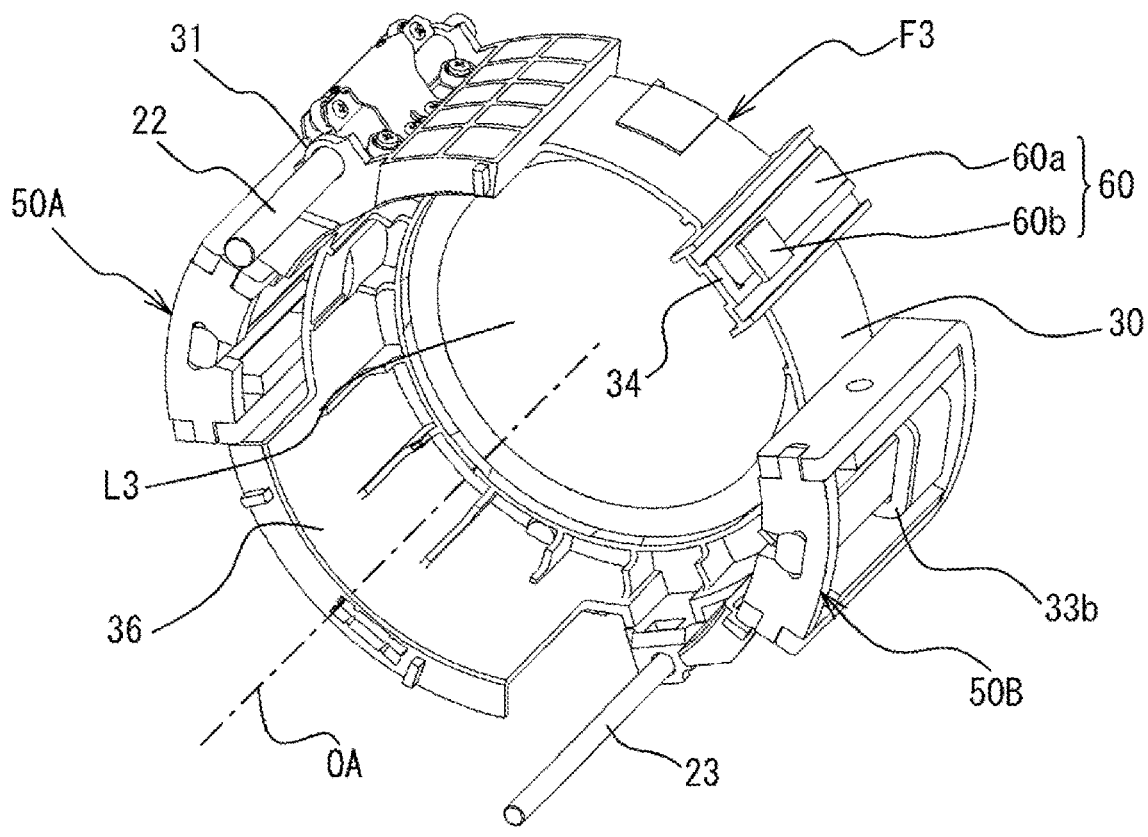
FIG. 4A and FIG. 4B are schematic perspective views of the lens holding frame.
Figure 4B:
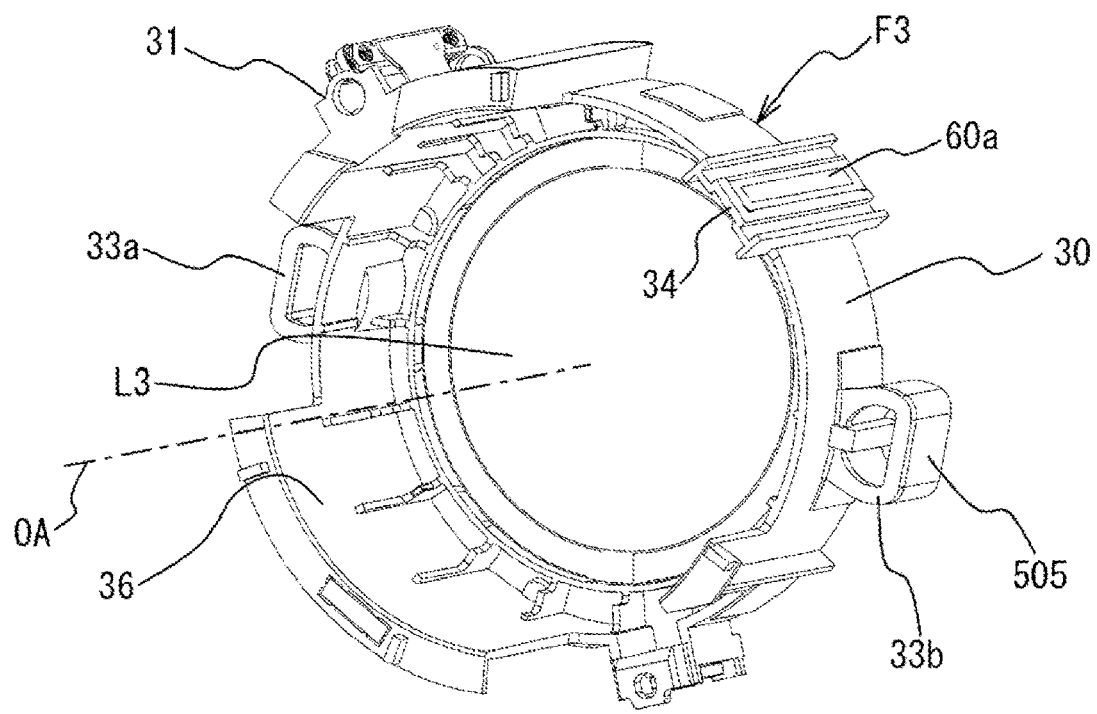
Figure 5:
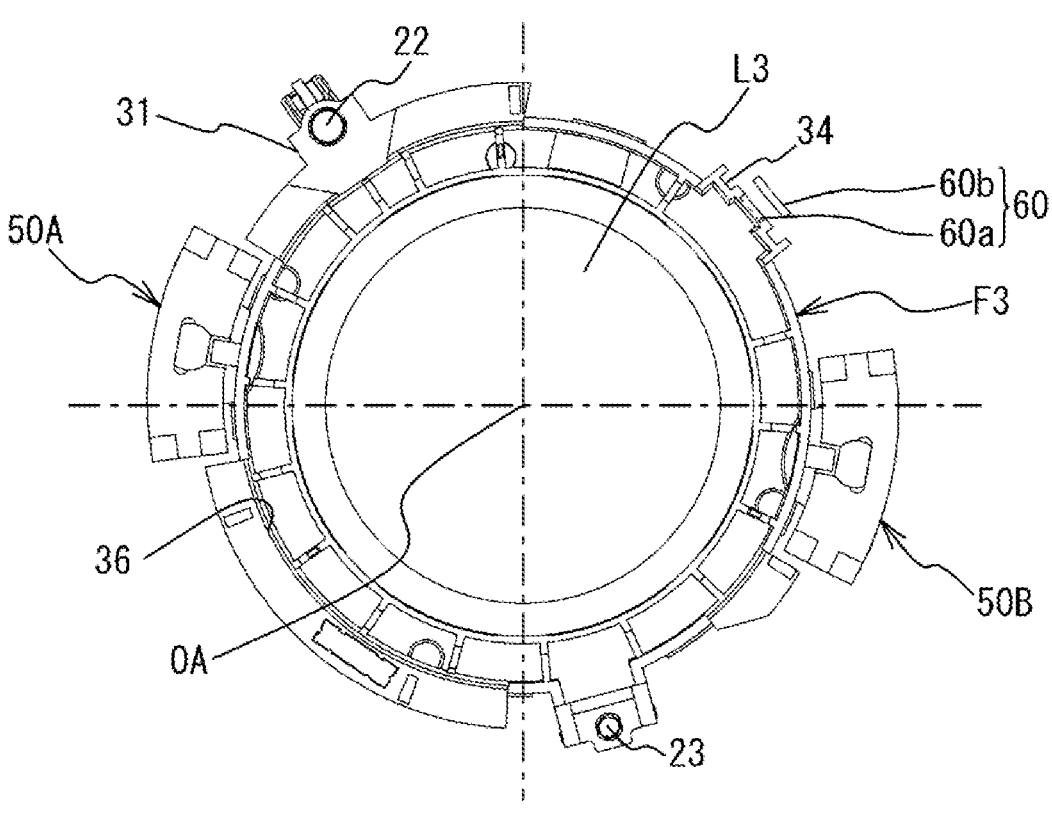
FIG. 5 is a plan view of the lens holding frame as viewed from the subject side.

Next, the configuration of the lens holding frame F3 will be described. FIG. 4A and FIG. 4B are schematic perspective views of the lens holding frame F3, and FIG. 5 is a plan view of the lens holding frame F3 as viewed from the subject side. In FIG. 4B, some of the components illustrated in FIG. 4A are not illustrated.

As illustrated in FIG. 4A and FIG. 4B, the lens holding frame F3 includes a cylindrical portion 30 that holds the lens group L3, and the outer peripheral portion of the cylindrical portion 30 is provided with an engaging portion 31 that engages with the guide bar 22, holding portions 33*a* and 33*b* that hold the coils 505 the first VCM 50A and the second VCM 50B (see FIG. 3), respectively, and a scale holding portion 34 for holding a scale portion 60*a* of the position detector 60. The lens holding frame F3 has an extending portion 36 that extends from the cylindrical portion 30 in the optical axis OA direction.

The lens barrel 100 includes the position detector 60 that detects the absolute position of the lens holding frame F3 (lens group L3) in the optical axis OA direction. The position detector 60 is, for example, an optical absolute (ABS) position detector, and includes the scale portion 60*a* and a sensor portion 60*b* provided opposite the scale portion 60*a*. In the present embodiment, the scale portion 60*a* is attached to the scale holding portion 34 along the optical axis OA direction, and the sensor portion 60*b* is attached to the second fixed barrel 20.

As illustrated in FIG. 5, the position detector 60 is disposed in a smaller region of the regions between the guide bar 22 and the second VCM 50B in the plane orthogonal to the optical axis OA. In addition, the first VCM 50A, the guide bar 22, the position detector 60, and the second VCM 50B, and the rotation restriction bar 23 are arranged in this order in the circumferential direction. In addition, the position detector 60 faces the extending portion 36 with the optical axis OA interposed therebetween in a plane orthogonal to the optical axis OA.

Figures 6A, 6B:
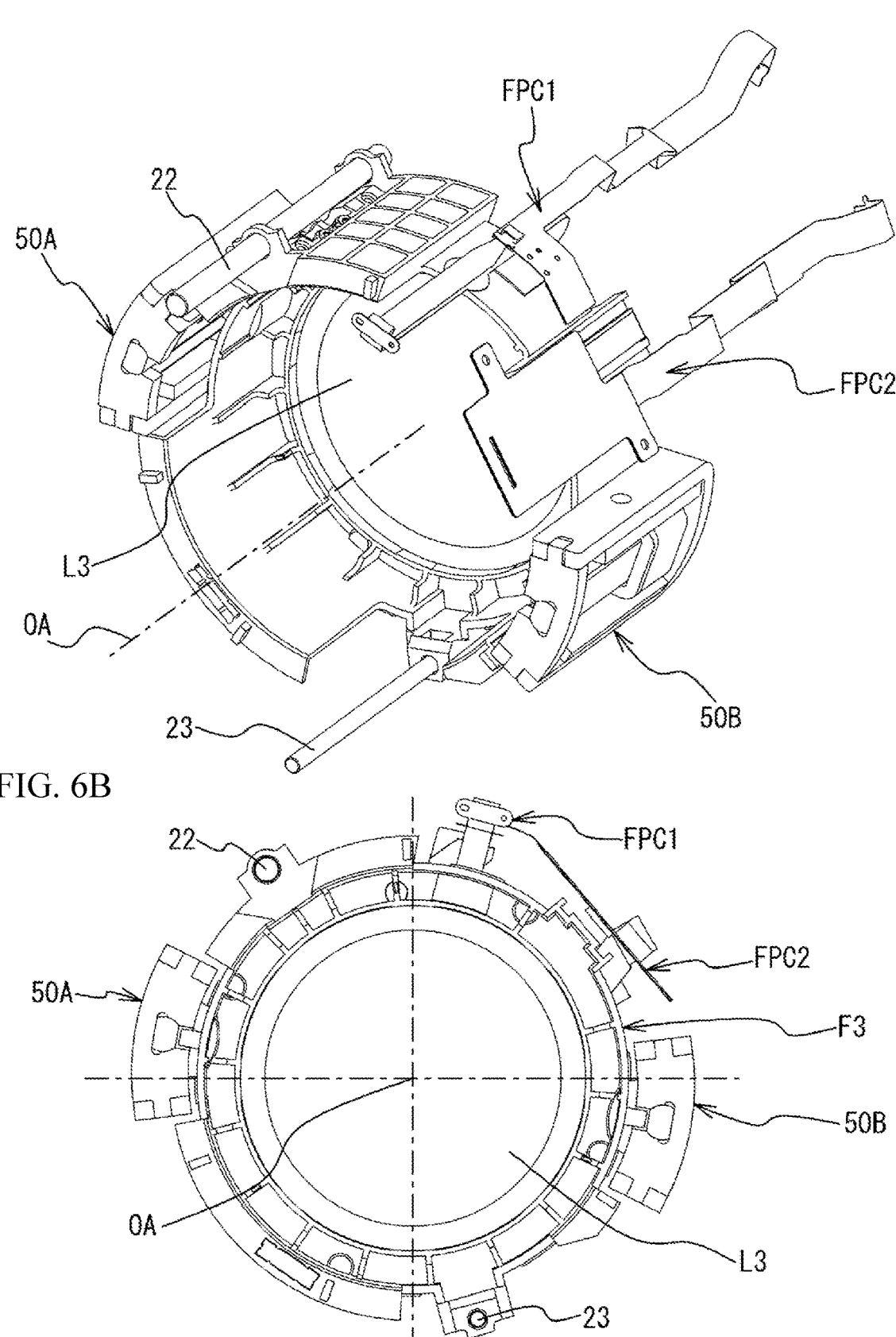
FIG. 6A and FIG. 6B are a perspective view and a plan view, respectively, for describing the arrangement of a first flexible substrate and a second flexible substrate.

Here, a first flexible substrate FPC1 is connected to the VCM 50, and a second flexible substrate FPC2 is connected to the position detector 60. FIG. 6A and FIG. 6B are a perspective view and a plan view, respectively, for describing the arrangement of the first flexible substrate FPC1 and the second flexible substrate FPC2.

As illustrated in FIG. 6B, in the plane perpendicular to the optical axis OA, the first flexible substrate FPC1 and the second flexible substrate FPC2 are arranged in the smaller region of the regions between the guide bar 22 and the second VCM 50B in the circumferential direction. In this manner, since the first flexible substrate FPC1 and the second flexible substrate FPC2 are collectively arranged, it is possible to simplify the wiring to the main substrate 120 arranged in the lens barrel 100.

Next, the arrangement position of the position detector 60 will be described in detail. First, a plurality of vibration modes generated in the lens group F3 and the lens holding frame L3 during the drive control of the lens holding frame F3 will be described.

The inventors simulated vibration modes generated in the lens group L3 and the lens holding frame F3 having the above-described configurations. In the simulation, it was assumed that the total mass of the lens group L3 and the lens holding frame F3 was 55 g to 83 g.

Figure 7A:
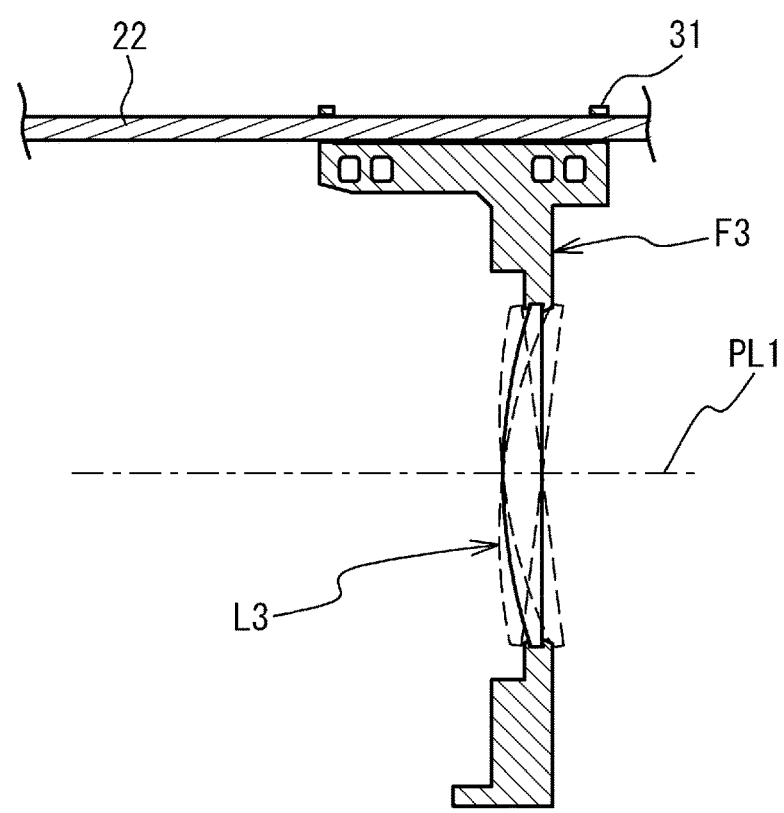
FIG. 7A and FIG. 7B are diagrams for describing the simulation results of vibration modes.
Figure 7B:
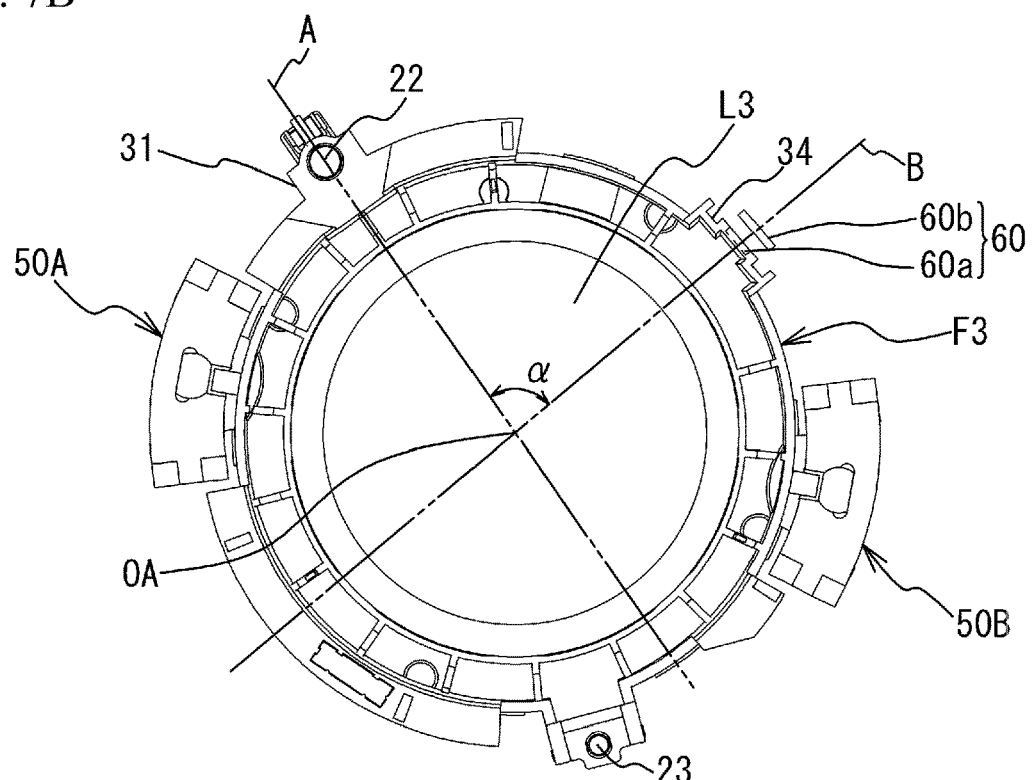

FIG. 7A and FIG. 7B are diagrams for describing the simulation results, FIG. 7A is a cross-sectional view of the lens group L3 and the lens holding frame F3, and FIG. 7B is a plan view of the lens holding frame F3 as viewed from the subject side.

As a result of the simulation, peaks (natural frequencies) of the frequency response function (transfer function) were observed at a plurality of frequencies. For example, when the total mass of the lens group L3 and the lens holding frame F3 was set to about 70 g, peaks of the frequency response function were observed at a plurality of frequencies including 264 Hz and 481 Hz.

Here, in the vibration mode (described as a mode 2) with the lowest natural frequency (264 Hz), a tilt motion having the starting point at the engaging portion 31 with the guide bar 22 is excited in the lens group L3 and the lens holding frame F3. In particular, in the mode 2, the lens group L3 moves (vibrates) as indicated by broken lines in FIG. 7A. As illustrated in FIG. 7B, this vibration is a vibration whose vibration amplitude is approximately zero (node) at the position of the straight line B in the plane orthogonal to the optical axis OA. The straight line B is a straight line that is substantially orthogonal to the straight line A connecting the center of the guide bar 22 and the optical axis OA and passes through the optical axis OA. That is, an angle between the straight line A and the straight line B is approximately 90°. Here, the term "approximately 90°" refers to, for example, a range of 80° to 100° or a range of 85° to 95°. In FIG. 7A, the movement of the lens holding frame F3 is not illustrated for the sake of simplicity, and the plane that includes the straight line B and is orthogonal to a plane perpendicular to the optical axis OA is indicated by PL1.

On the other hand, in the vibration mode (referred to as a mode 3) having the second lowest natural frequency (481 Hz), vibrations whose amplitude is approximately zero (node) at the position of the straight line A connecting the center of the guide bar 22 and the optical axis OA are generated in the lens group L3 and the lens holding frame F3.

When the vibration mode was actually checked in an actual machine in which the total mass of the lens group L3 and the lens holding frame F3 was adjusted to be 55 g to 83 g, the node of the vibration mode having the lowest natural frequency was observed at the position of the straight line B in FIG. 7B.

When the lens group L3 and the lens holding frame F3 vibrate, the position detector 60 detects not only the position of the lens holding frame F3 in the optical axis OA direction but also displacement of the lens group L3 and the lens holding frame F3 in the optical axis OA direction due to the vibration. This reduces the accuracy in detection of the position of the lens holding frame F3 (lens group L3). The decrease in the position detection accuracy of the lens holding frame F3 causes a decrease in focusing accuracy.

In order to reduce the structural resonance of the control target, it is generally said that it is preferable to satisfy B<A/5, where A is the frequency value of the structural resonance of the control target and B is the control frequency. As can be seen from the equation, a smaller A results in a smaller B (control frequency). As the control frequency decreases, the intervals of control (control cycles) become longer, and thus the responsivity of the drive control of the VCM 50 deteriorates.

When the target value of the control frequency is 70 Hz to 100 Hz, the natural frequency of the mode 2 is 264 Hz.

Therefore, when the control frequency is determined from the above equation based on the natural frequency (264 Hz) of the mode 2, the control frequency is, for example, 52.8 Hz, and do not fall within the range of the target values. That is, when the control frequency is determined based on the natural frequency of the mode 2, the responsivity of the drive control of the VCM 50 is deteriorated.

Therefore, in the present embodiment, the scale portion 60a of the position detector 60 is arranged at the position where the node is generated in the mode 2. More specifically, the scale holding portion 34 of the lens holding frame F3 is disposed at the position where the node is generated in the mode 2, and the scale portion 60a is attached to the scale holding portion 34. More specifically, the scale portion 60a (position detector 60) is placed so that the angle α between the straight line A connecting the center of the guide bar 22 and the optical axis OA and the straight line B connecting the scale portion 60a and the optical axis OA is approximately 90° in the plane orthogonal to the optical axis OA (see FIG. 7B).

By arranging the position detector 60 in this manner, even when the lens group L3 and the lens holding frame F3 vibrate in the mode 2, the positions of the lens group L3 and the lens holding frame F3 are hardly displaced at the node, and therefore, the influence of the vibration in the mode 2 on the detection accuracy of the position detector 60 can be reduced.

Since the natural frequency of the mode 3 is 481 Hz, when the control frequency is determined based on the natural frequency of the mode 3, the control frequency is 96.2 Hz, which falls within the range of the target values of the control frequencies. Thus, the responsivity of the drive control of the VCM 50 can be improved. Further, since the control frequency can be adjusted to be less than one fifth of the natural frequency of the mode 3, it is possible to reduce the influence of the vibration in the mode 3 on the control.

As described above in detail, in the present embodiment, the lens barrel 100 includes the lens holding frame F3 that holds the lens group L3, the second fixed barrel 20 that is located further outward than the lens holding frame F3, the guide bar 22 that guides the lens holding frame F3 in the optical axis OA direction, the VCM 50 that moves the lens holding frame F3 in the optical axis OA direction, the position detector 60 that detects the position of the lens holding frame F3 in the optical axis OA direction, and the drive device 110 that controls the VCM 50 based on the information on the position detected by the position detector 60. The position detector 60 includes the scale portion 60a arranged along the optical axis OA direction and the sensor portion 60b arranged opposite the scale portion 60a. The lens holding frame F3 holds the scale portion 60a, the second fixed barrel 20 holds the sensor portion 60b, and in the lens holding frame F3, the scale portion 60a is disposed at the position corresponding to a node of the vibration mode having the lowest natural frequency among a plurality of vibration modes generated in the lens group L3 and the lens holding frame F3. Thus, even when the lens group L3 and the lens holding frame F3 vibrate in the vibration mode with the lowest natural frequency, the positions of the lens group L3 and the lens holding frame F3 hardly change at the position where the position detector 60 is arranged. Therefore, it is possible to reduce the influence of the vibration in the vibration mode with the lowest natural frequency on the detection accuracy of the position detector 60. Thus, position detection accuracy of the position detector 60 can be improved, and therefore, the accuracy (focusing accuracy) of the focusing operation performed based on the detection result of the position detector 60 can be improved. Further, since the control frequency can be determined based on the natural frequency of the vibration mode having the second lowest natural frequency, the control frequency can be set to be large, and the responsivity of the drive control of the VCM 50 can be improved while reducing the influence of the vibration mode having the second lowest natural frequency on the control.

In the present embodiment, in the plane orthogonal to the optical axis OA, the angle α between the straight line A connecting the center of the guide bar 22 and the optical axis OA and the straight line B connecting the scale portion 60a and the optical axis OA is approximately 90°. When the total mass of the lens group L3 and the lens holding frame F3 is 55 grams or greater, the node of the mode 2 is positioned on the straight line B substantially orthogonal to the straight line A. Therefore, by arranging the scale portion 60a on the straight line B, it is possible to reduce the influence of the vibration in the mode 2 on the detection accuracy of the position detector 60, and it is possible to improve the focusing accuracy.

In the present embodiment, the VCM 50 includes the first VCM 50A and the second VCM 50B, the first VCM 50A is disposed closer to the guide bar 22 than the second VCM 50B, and the position detector 60 is disposed in a smaller region of the regions between the guide bar 22 and the second VCM 50B in the circumferential direction of the circle centered on the optical axis OA. Although there is little space near the first VCM 50A because the guide bar 22 is disposed, the configuration of the present embodiment enables efficient use of the space between the guide bar 22 and the second VCM 50B.

In the present embodiment, the lens barrel 100 includes the first flexible substrate FPC1 connected to the VCM 50 and the second flexible substrate FPC2 connected to the position detector 60, and the first flexible substrate FPC1 and the second flexible substrate FPC2 are disposed in a smaller region of the regions between the guide bar 22 and the second VCM 50B in the circumferential direction of the circle centered on the optical axis OA. Since the first flexible substrate FPC1 and the second flexible substrate FPC2 are collectively disposed, it is possible to simplify the wiring to the main substrate 120.

Figure 8A:
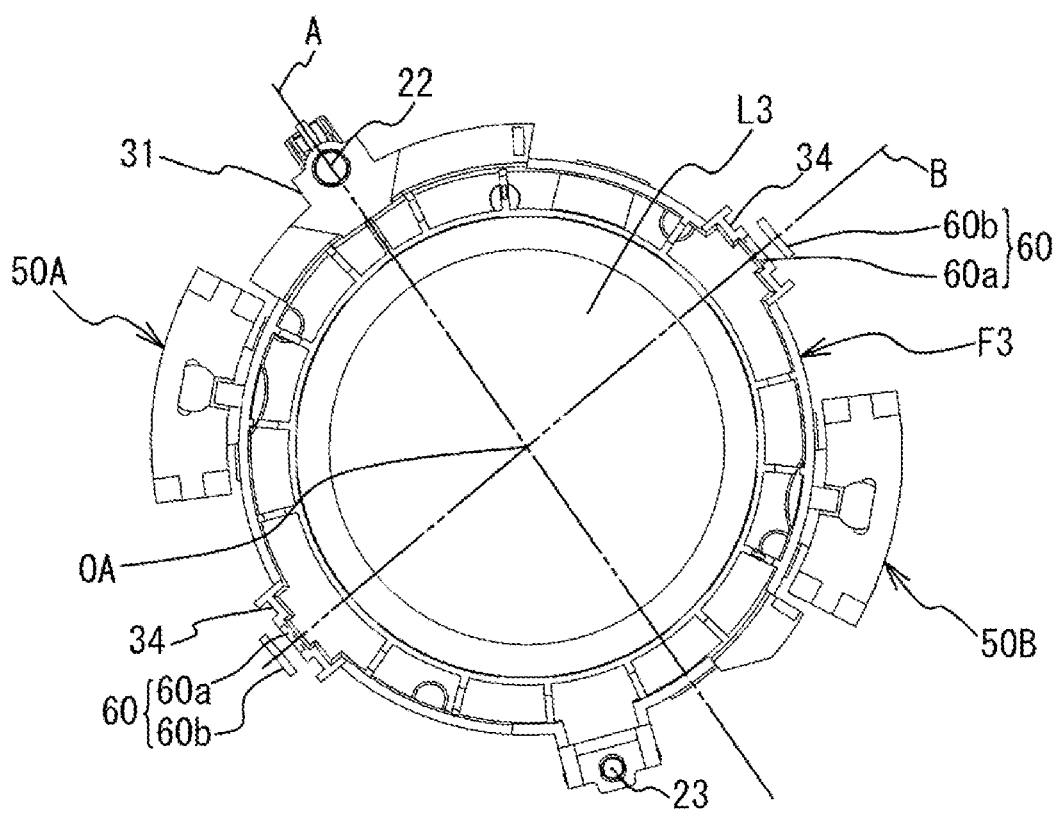
FIG. 8A and FIG. 8B are views for describing another example of the arrangement of a position detector.

In the above embodiment, one position detector 60 is provided, but two position detectors 60 may be provided. In this case, as illustrated in FIG. 8A, the two position detectors 60 may be provided at positions corresponding to the nodes in the mode 2 so as to face each other across the optical axis OA in a plane orthogonal to the optical axis OA. That is, the position detector 60 may be provided at two positions where the straight line B substantially orthogonal to the straight line A connecting the axial center of the guide bar 22 and the optical axis OA intersects with a circle centered on the optical axis OA in a plane perpendicular to the optical axis OA. By averaging the position information detected by the two position detectors 60, the position detection accuracy of the lens holding frame F3 can be further improved.

Figure 8B:
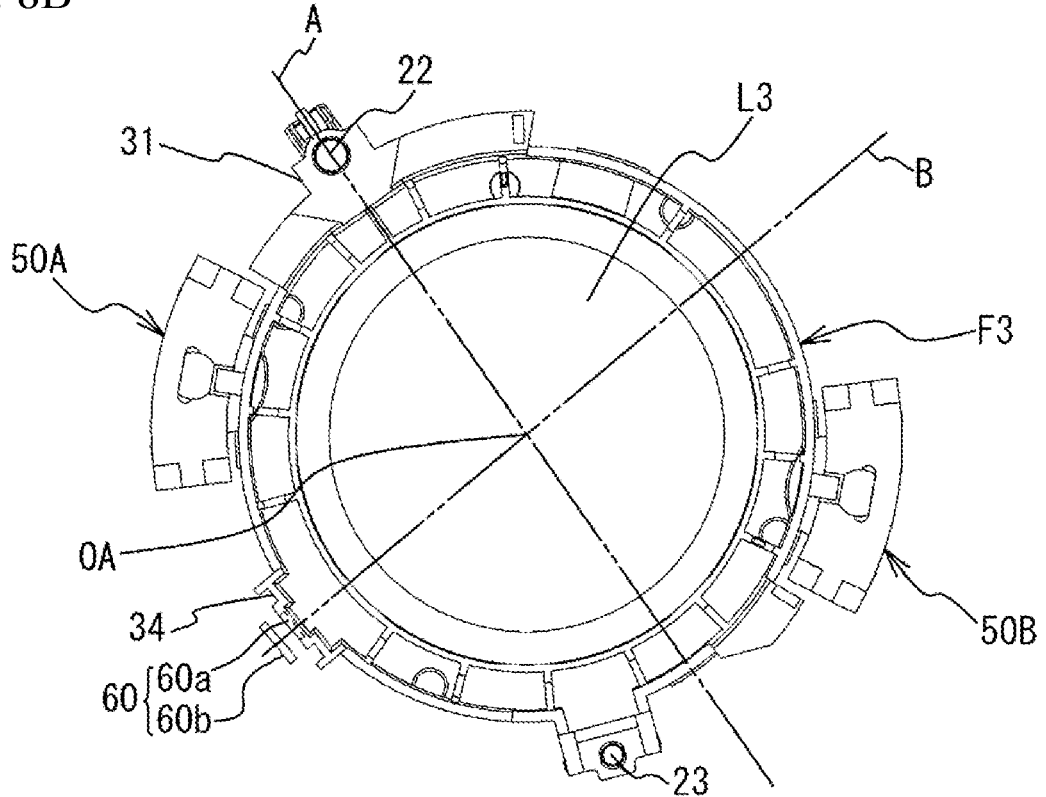

In the embodiment described above, the position detector 60 is disposed between the guide bar 22 and the second VCM 50B in the circumferential direction of the circle centered on the optical axis OA, but may be disposed between the first VCM 50A and the rotation restriction bar 23, for example, as illustrated in FIG. 8B. Also in this case, the position where the scale portion 60a of the position detector 60 is arranged is a position where a node is generated in the mode 2.

Further, in the above embodiment, the example in which the position detector 60 is the optical-ABS position detector that detects the absolute position of the lens holding frame F3 has been described, but the position detector 60 may be a position detector that detects the relative position of the lens holding frame F3. The position detector 60 may be, for example, a magnetic type or a photoelectric type instead of an optical type.

In the above embodiment, the scale portion 60a of the position detector 60 is attached to the lens holding frame F3, and the sensor portion 60b is attached to the second fixed barrel 20, but this does not intend suggest any limitation. The scale portion 60a may be provided on the second fixed barrel 20, and the sensor portion 60b may be provided on the lens holding frame F3.

In the above embodiment, the lens holding frame F3 is guided in the optical axis OA direction by the guide bar 22, but this does not intend to suggest any limitation. For example, the lens holding frame F3 may be guided in the optical axis OA direction by a straight groove.

In the above embodiment, the second fixed barrel 20 that houses the lens holding frame F3 may be a movable barrel that can move straight in the optical axis OA direction. In the above embodiment, the lens barrel 100 may be a single focus lens or a zoom lens.

The above embodiments are preferred examples. However, the present disclosure is not limited to this, and various modifications can be made without departing from the scope of the present disclosure, and arbitrary constituent features may be combined.

DESCRIPTION OF REFERENCE NUMERALS

1 camera
20 second fixed barrel
22 guide bar
23 rotation restriction bar
36 extending portion
50A first VCM
50B second VCM
60 position detector
60a scale portion
60b sensor portion
100 lens barrel
101 camera body
F3 lens holding frame
L3 lens group

The invention claimed is:

1. A lens barrel comprising:
   a lens holding frame that holds a lens;
   an outer barrel that is disposed further outward than the lens holding frame;
   a guide portion that guides the lens holding frame in an optical axis direction;
   an actuator that moves the lens holding frame in the optical axis direction;
   a detector that includes a scale portion arranged along the optical axis direction and a sensor portion arranged so as to face the scale portion, and detects a position of the lens holding frame in the optical axis direction; and
   a controller that controls the actuator based on information about a position detected by the detector,
   wherein the lens holding frame holds one of the scale portion and the sensor portion,
   wherein the outer barrel holds another one of the scale portion and the sensor portion, and wherein, in the lens holding frame, the one of the scale portion and the sensor portion is disposed at a position corresponding to a node of a vibration mode having a lowest natural frequency among a plurality of vibration modes generated in the lens and the lens holding frame.

2. The lens barrel according to claim 1, wherein an angle between a first straight line connecting a center of the guide portion and the optical axis and a second straight line connecting the one of the scale portion and the sensor portion and the optical axis is approximately 90 degrees in a plane orthogonal to the optical axis.

3. The lens barrel according to claim 1, wherein a total mass of the lens and the lens holding frame is greater than 55 grams.

4. The lens barrel according to claim 1, wherein the actuator includes a first actuator and a second actuator, wherein the first actuator is disposed closer to the guide portion than the second actuator, and wherein the detector is disposed in a smaller region of regions between the guide portion and the second actuator in a circumferential direction.

5. The lens barrel according to claim 4, wherein the first actuator, the guide portion, the detector, and the second actuator are arranged in this order in the circumferential direction.

6. The lens barrel according to claim 4, further comprising:

a first flexible substrate connected to the actuator; and a second flexible substrate connected to the detector, wherein the first flexible substrate and the second flexible substrate are disposed in a smaller region of regions between the guide portion and the second actuator in the circumferential direction.

7. The lens barrel according to claim 1, wherein the detector includes a first detector and a second detector, wherein the first detector and the second detector are provided so as to face each other across the optical axis at positions corresponding to nodes of the vibration mode having the lowest natural frequency in a plane orthogonal to the optical axis, and wherein the controller controls the actuator based on the information about a position detected by the first detector and information about a position detected by the second detector.

8. The lens barrel according to claim 1, wherein the lens holding frame includes an extending portion that extends in the optical axis direction, and wherein the detector and the extending portion face each other across the optical axis in a plane orthogonal to the optical axis.

9. An imaging apparatus comprising:

the lens barrel according to claim 1; and an image sensor.

* * * * *